United States Patent
Matsuoka

[11] 3,829,067
[45] Aug. 13, 1974

[54] APPARATUS FOR COMPOUNDING RUBBER, ELASTOMER, PLASTIC AND LIKE MIXES

[75] Inventor: James T. Matsuoka, Brecksville, Ohio

[73] Assignee: Intercole Automation, Inc., Cleveland, Ohio

[22] Filed: May 7, 1973

[21] Appl. No.: 358,015

[52] U.S. Cl. ............................................. 259/192
[51] Int. Cl. ........................... A21c 1/06, B29b 1/10
[58] Field of Search ......... 259/191, 192, 193, 6, 21, 259/42, 64, 104; 425/208

[56] References Cited
UNITED STATES PATENTS

| | | | |
|---|---|---|---|
| 3,143,767 | 8/1964 | Wirth | 259/6 |
| 3,239,878 | 3/1966 | Ahlefeld | 259/6 |
| 3,700,374 | 10/1972 | Matsuoka | 259/192 |
| 3,764,118 | 10/1973 | Matsuoka | 259/192 |

Primary Examiner—Robert W. Jenkins
Attorney, Agent, or Firm—Watts, Hoffman, Fisher & Heinke Co.

[57] ABSTRACT

Internal or closed chamber high shear mixing apparatus for compounding materials including solid ingredients which become gelatinous at temperatures above ambient temperature, such as, rubber, elastomer, plastic, and like mixes, in a continuous manner having a pair of parallel material processing rotors in side-by-side communicating chambers closed except for a material feed opening adjacent one end and a material discharge opening adjacent the other end communicating with a screw controlled discharge conduit offset from and extending transversely of the axes of rotation of the rotors. Each rotor has a material conveying screw section adjacent the material feed opening followed by a material processing section comprising two pairs of discrete material processing blade portions offset axially with respect to one another. Both pairs of blade portions of one rotor are helically orientated more lengthwise of the axis of the rotor than circumferentially thereof and twist in opposite directions with the pair adjacent the discharge of the material processing chamber having a lower helix or lead angle than that of the other pair. The other rotor has one pair of helically orientated material processing blade portions extending more lengthwise of the axis of the rotor than circumferentially thereof and the other pair orientated lengthwise of the rotor axis.

7 Claims, 7 Drawing Figures

APPARATUS FOR COMPOUNDING RUBBER, ELASTOMER, PLASTIC AND LIKE MIXES

FIELD OF INVENTION

This invention relates to apparatus for continuous compounding of rubber, elastomer, plastic and like mixes by the use of a closed rotor high-shear type apparatus.

PRIOR ART

Apparatus for continuous mixing and/or otherwise processing rubber and like material mixes within a closed chamber by the action of parallel rotors are known. In such devices the intensity of the mixing of the material is a function of many variables including the configuration of the rotors.

Typical prior U.S. Pats. in this are Ahlefeld, Jr. et al. No. 3,239,873 and Matsuoka et al. No. 3,700,374.

SUMMARY OF INVENTION

The present invention provides a novel and improved internal or closed chamber, high shear continuous material mixing apparatus for compounding rubber, elastomer, plastic and like mixes, comprising a pair of material processing rotors in side by side communicating processing chambers closed except for a motored feed opening adjacent one end and a discharge opening adjacent the other end, each rotor of the apparatus has two pairs of material processing blade portions offset with respect to one another lengthwise of the rotor. Both pairs of blade portions of one rotor are helically oriented and twisting in opposite directions and the other rotor has one pair of helically oriented blade portions and a second pair extending lengthwise of the axis of the rotor. The rotors of the present invention have a configuration which in association with the other parts of the apparatus processes material of the character referred to more efficiently, in less time, and produces a better interdispersion of the materials.

More specifically, the present invention provides a novel and improved internal continuous processing apparatus for compounding materials of the character referred to comprising fast and slow material processing rotors in side by side communicating processing chambers closed except for a material feed opening adjacent one end and a discharge opening adjacent the other end, each having two pairs of discrete material processing blade portions offset with respect to one another lengthwise of their respective rotors. The pairs of blade portions of the fast rotor are both helically oriented and twisting in opposite directions with the pair of blade portions adjacent the discharge end of the processing chambers being longer than and having a lower helix or lead angle than the helix or lead angle of the other pair. The pair of blade portions of the slow rotor adjacent the discharge end of the processing chambers being straight and extending lengthwise of the axis of rotation of the rotor and the other pair having a helix or lead angle essentially the same as the helix or lead angle of the pair of blade portions of the fast rotor adjacent the material conveying screw section thereof. The pair of blade portions of the fast rotor adjacent the material conveying screw section thereof being the shorter of the pairs of helical blade sections of both rotors and the pair of blade portions of the fast rotor adjacent the discharge end being the longer of the pairs of helical blade portions of both rotors. The pair of helical blade portions adjacent the conveying screw section of the slow rotor being longer than the pair of helical blade portions on the fast rotor adjacent the conveying screw section thereof.

The invention will be better understood and further advantages, as well as objects thereof, will become apparent from the accompanying drawing and ensuing description of the preferred embodiment of the invention.

DESCRIPTION OF PREFERRED EMBODIMENT

Figure 1:
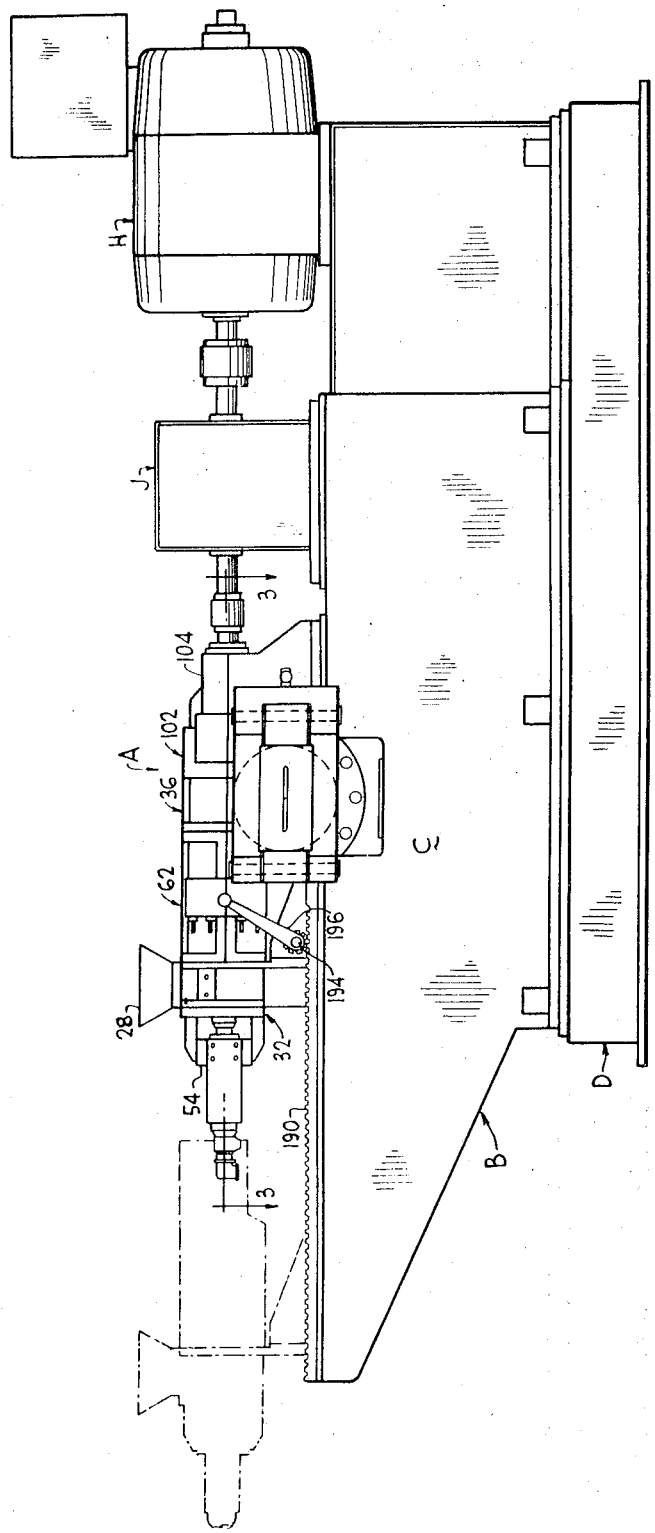
FIG. 1 is a side elevational view of apparatus embodying the present invention.

The preferred embodiment of the invention is a material mixing and extruding apparatus indicated generally by the reference character A and through which material being processed moves continuously. The apparatus comprises a built-up frame B including a bed member C supported on a metal base D, two cast metal rotors E, F, and a cast metal rotatable material conveying screw G, preferably an extruder screw for controlling the flow of material through the apparatus. The rotors E, F are supported for rotation in a tubular chamber the lower part of the downstream end of which is intersected in a chamber or conduit extending transversely thereof and in which the screw G is located. The rotors E, F are rotated in opposite directions by a variable speed electric motor H through a gear-type speed reducer J. The screw G, which is preferably an extruder screw, is rotated by a variable speed electric motor K through a gear-type speed reducer L.

The tubular chamber in which the rotors E, F are supported for rotation comprises two side-by-side elongated partial cylindrical apertures 10, 12, of like diameter and in continuous longitudinal communication with one another. The longitudinal communication between the apertures 10, 12 is provided by removing part of the frame which would otherwise separate the apertures to provide an elongated opening 13 between the apertures having a width equal to from about 35 percent to about 80 percent of the diameter of the apertures. The rotors E, F are provided with material processing blade sections 14, 16 preceded by material conveying screw sections 18, 20 and are located in the apertures 10, 12, respectively. The combined portions of the apertures 10, 12 through which the material conveying screw sections of the rotors extend are sometimes hereinafter referred to as the feed chamber M, the combined portions through which the material processing blade sections extend as the mixing chamber N, and the combined portions at the downstream end of the mixing chamber as the discharge chamber P.

Figure 2:
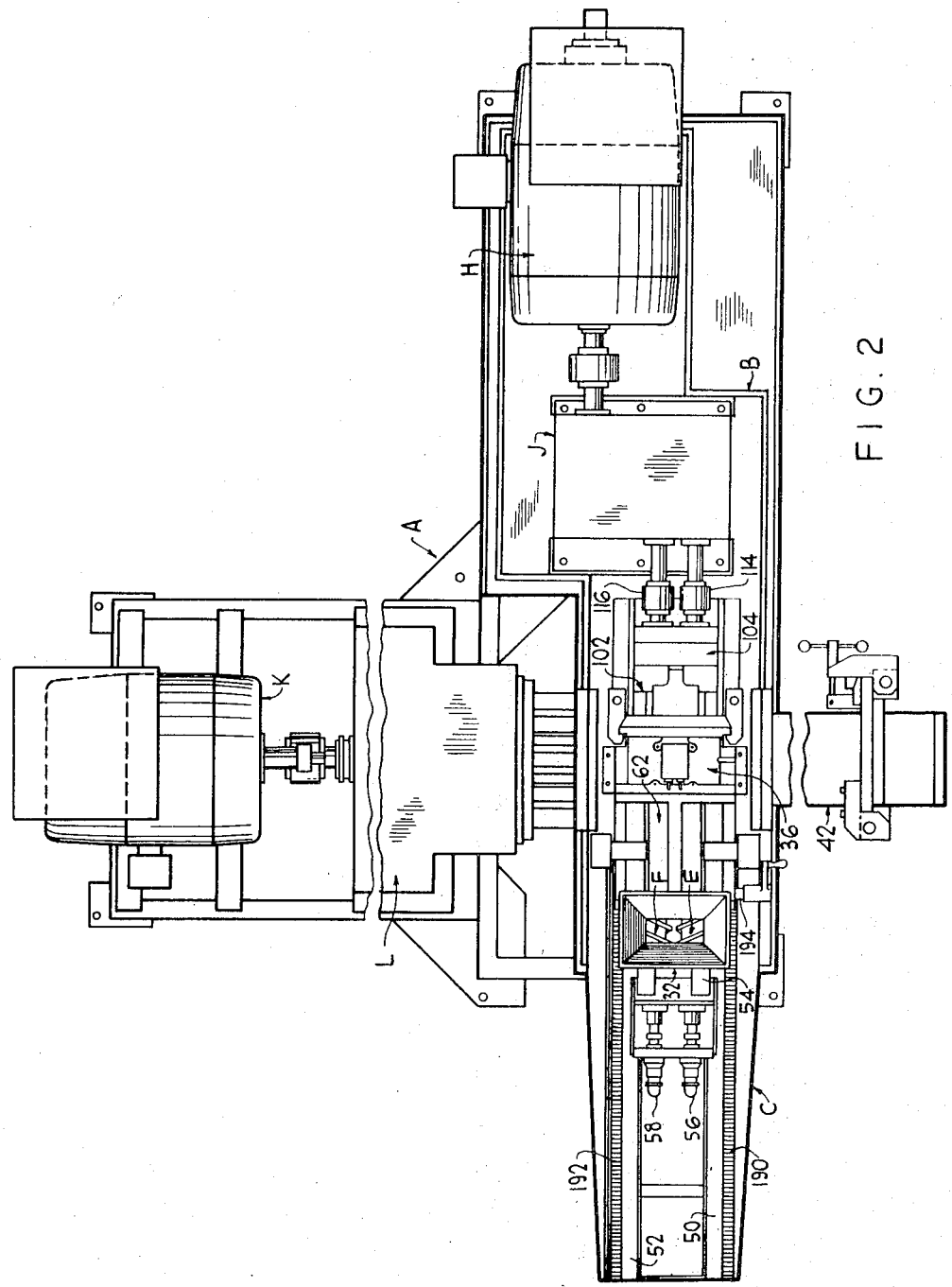
FIG. 2 is a plan view of the apparatus shown in FIG. 1.
Figure 3:
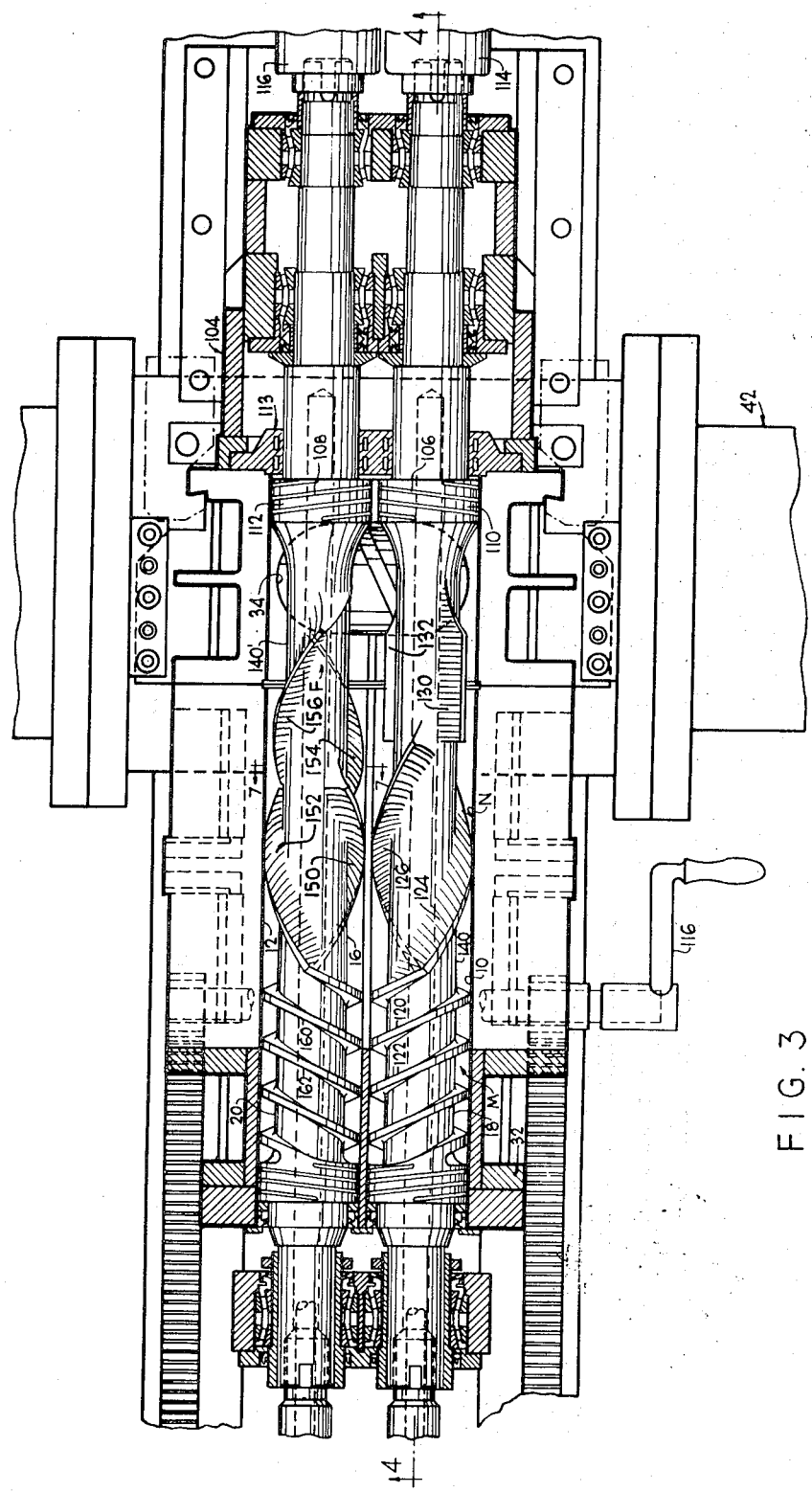
FIG. 3 is a fragmentary sectional view with portions in elevation approximately on the line 3—3 of FIG. 1.
Figure 4:
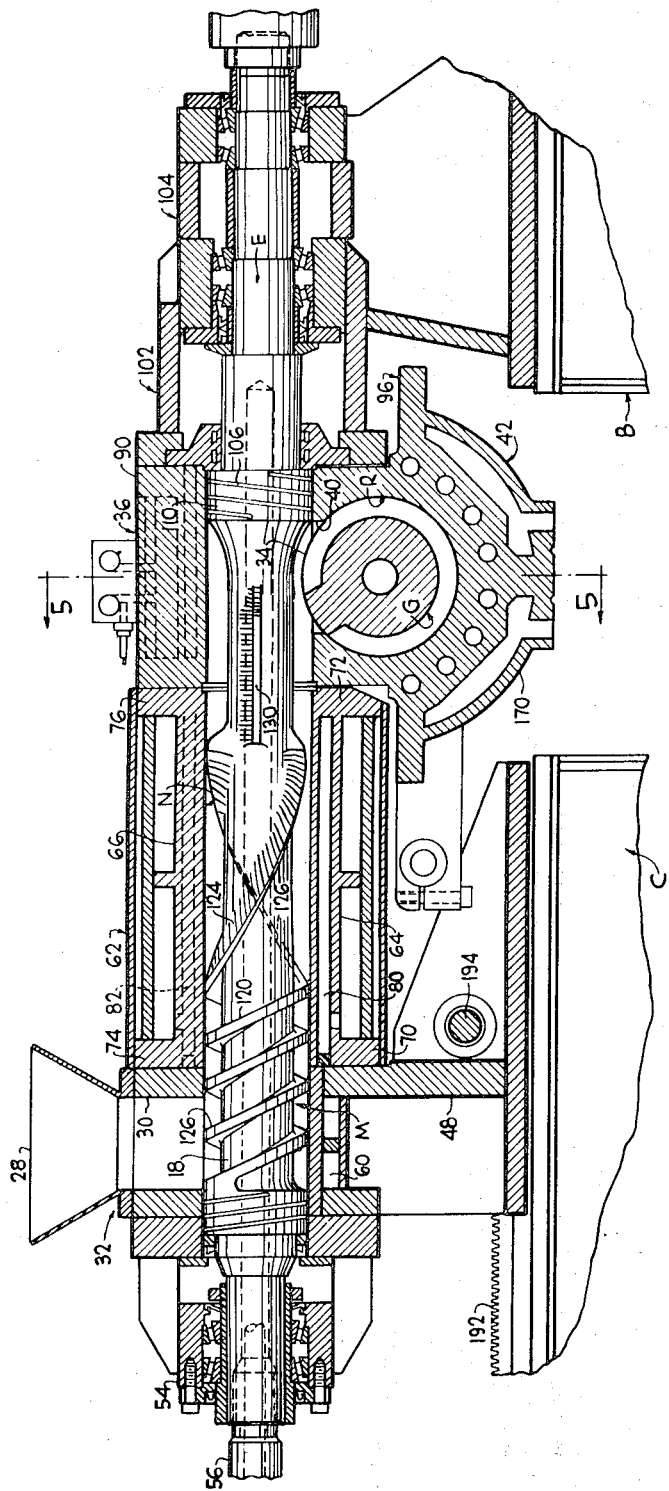
FIG. 4 is a fragmentary sectional view approximately on the line 4—4 of FIG. 3.

Material to be processed is fed to the feed chamber M, as by gravity, through a feed hopper 28 and an aperture 30 in a feed chamber sub-assembly 32 extending downwardly to the top of the feed chamber M. From the mixing chamber N the mixed material is discharged through a downwardly opening aperture 34 in a discharge chamber sub-assembly 36. The discharge chamber P is in effect an extension of the chamber N and both can be considered as and are sometimes referred to as the mixing chamber. The aperture 34 opens into or is in communication with an opening or aperture 40 in a control screw chamber sub-assembly 42 which in turn communicates with a control screw chamber R, that is, an elongated cylindrical aperture within which the control screw G is located, which preferably is an extruder screw. The aperture 40 communicates with the chamber R adjacent to its rear end as the apparatus is viewed in FIGS. 1 and 2.

The feed hopper 28, the aperture 30 and the feed chamber M are a part of the feed chamber sub-assembly and comprises a built-up sub-frame 48 slidably supported at the top side of the bed C for movement along suitable guideways 50, 52 thereon extending lengthwise of the axis of the rotors E, F. A bearing assembly 54, which supports the left-hand ends of the rotors E, F is detachably connected to and carried by the sub-frame 48. The left-hand ends of the rotors E, F engage within the inner races of anti-friction bearings in the bearing assembly 54 with a sliding fit for a purpose hereinafter apparent. Suitable seals are provided adjacent to the adjoining parts of the sub-frame 48 and the bearing assembly surrounding the rotors E, F to prevent the escape of material being processed from the left-hand side of the feed Chamber M. The seals are so constructed that they can be slid on and off the ends of the rotors E, F for a purpose hereinafter apparent. Adaptor assemblies 56, 58 carried by the bearing assembly and connected to the left-hand ends of the rotors E, F by slip couplings or connectors provide for the circulation of heat transfer fluid through the rotors. The sub-frame 48 is preferably provided with fluid passageways 60 in the wall of the feed chamber for the circulation of heat transfer fluid, as desired.

The mixing chamber sub-assembly 62 includes a sub-frame 63 comprising upper and lower housing members 64, 66 detachably secured together and terminating at opposite ends in flanges 70, 72 and 74, 76, respectively, and is detachably connected to and carried by the sub-frame 48 by having the left-hand end flanges 70, 74 of the members 64, 66 bolted to the adjoining wall of the sub-frame 48. The members 64, 66 are provided with longitudinally extending drilled apertures 80, 82 located closely adjacent to the inner walls of the mixing chamber and connected to suitable headers, etc., for the circulation of heat transfer fluid therethrough.

The discharge chamber sub-assembly includes a sub-frame 90 abutting against and detachably connected to the end flanges 72, 76 of the mixing chamber housing member 64, 66 and has a planar bottom side 92 which engages and rests upon a planar surface 94 on the top side of a sub-frame 96 of the control screw chamber sub-assembly 42. The sub-frame 96 is supported on the top of the bed C and is connected to the speed reducer L by a spacer assembly 98 detachably connected to the sub-frame 96 and the speed reducer L. The planar surface on the bottom side of the subframe 90 is held in close engagement with the planar surface on the top side of the sub-frame 96 by machine screws 100 threaded into suitable tapped apertures in flanges along opposite sides of the sub-frame 90 and engaging the upper side of flanges extending along opposite sides of the sub-frame 96.

Figure 5:
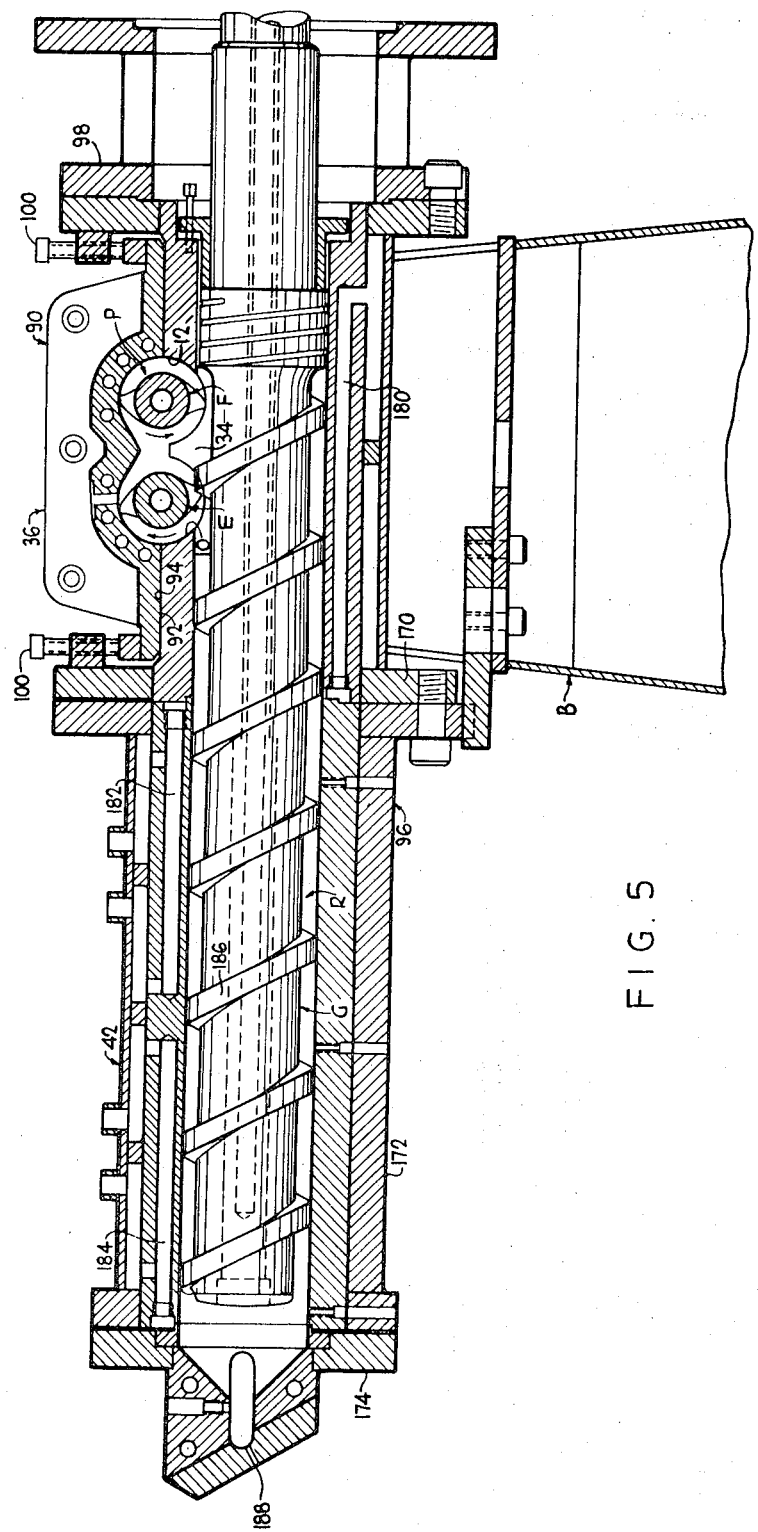
FIG. 5 is a fragmentary sectional view approximately on the line 5—5 of FIG. 4.

The right-hand end of the discharge sub-frame 90 abuts against the left-hand end of a seal assembly 102 connected to and carried by a bearing assembly 104 which rotatably supports the right-hand end of the rotors E, F. The bearing assembly is fixedly connected to the top side of the bed C. Pairs of spiral double grooves 106, 108, in cylindrical sections 110, 112 of the rotors E, F, respectively, at the right hand ends of the cylindrical apertures 10, 12, respectively, assist in relieving pressure of material being mixed from the right-hand end seal 113 of the discharge assembly. The rotors E, F, are driven from the speed reducer J through suitable couplings 114, 116. The rotor E in a clockwise direction, as viewed in FIG. 5 and rotor F in the opposite direction. The rotor E is the slower of the two rotors and is driven at about 90 percent to 95 percent of the speed of rotor F.

Rotor E may be considered as having a generally cylindrical body portion provided with a double thread feed screw on the material infeed section 18 and material processing blade portions on the bladed section 14. The blade portions adjacent to the discharge or downstream end of the rotor extend into the adjoining part of the cylindrical aperture 10 located in the discharge sub-assembly 36 and terminate above the opening 34. The threads 120, 122 of the infeed section of the rotor terminate adjacent to the entrance or upstream end of the mixing chamber N, and preferably connect with the adjacent ends of the near pair of mixing blade portions 124, 126, respectively. The threads 120, 122, shown, are of the square type and have a helical or lead angle of about 15° to 40°, preferably about 18°. Other thread constructions, however, may be employed. The rotor E is provided with a second pair of mixing blade portions 130, 132, at the other or downstream end of the rotor.

The mixing blade portions 124, 126 of rotor E have convex leading sides, are equal in length and curve or twist about the rotor body, preferably helically, through about 10° to 195° at right-hand helix or lead angles of about 50° to 80°, which is at angles $a$ of about 10° to 40° to the axis of the rotor. Assuming that the rotor E rotates in the direction indicated by the arrow in FIG. 5, the pair of blade portions 124, 126 twist as shown in the drawings, that is, with the ends thereof nearest the conveying screw threads 120, 122 leading the other ends thereof. The blade portions 130, 132 of rotor E are straight and lengthwise of and parallel with the axis of rotation of the rotor E and like the blade portions 124, 126 have convex leading sides. The blade portions 130, 132 are equal in length, are located 180° from one another and extend along the body portion 140 of the rotor E to or approximately to the vertical centerline of the discharge screw G. Beginning at or approximately at the upstream end of the aperture 34 the mixing blade portions 130, 132 merge or feather into the cylindrical body portion of the rotor on a radius slightly larger than that of the chamber R in which the discharge screw G rotates. The radius is such that it is tangent with the exterior of the rotor body portion at or approximately at the plane of the vertical center line of the discharge screw. From the plane of the vertical center line of the discharge screw, the diameter of the cylindrical rotor body portion increases on the aforementioned radius to the end of the discharge chamber P where it terminates at the cylindrical section 110 of the rotor. The adjoining ends of the pairs of blade portions 124, 126 and 130, 132 of rotor E are preferably displaced angularly of the axis of rotation of the rotor from one another about 90°. This, however, is not necessary as the adjacent ends of the adjoining blades could connect with one another.

The rotor F has two pairs of mixing blade portions 150, 152, and 154, 156 with convex leading sides and like the blade portions 124, 126 of rotor E curve or twist about the rotor body, preferably helically, through about 10° to 195° at left and right helix or lead angles, respectively. The blade portions 150, 152 adjacent the infeed end of the processing chamber are orientated with left helix or lead angles of 50° to 80° preferably of about 55° to 60° and the other pair 154, 156 adjacent the discharge opening for the mixing chamber preferably with right helix or lead angles about 10° to 70° less than those of the other pair. In other words the blade portions 150, 152 are at angles $b$ of about 10° to 40°, preferably of about 30° to 35° with the axis of rotor F whereas the blade portions 154, 156 are at greater angles $c$ to the axis of the rotor of about 20° to 80°. The respective blade portions of each pair are preferably of equal length and located 180° from one another and twist in the same direction from one end of the mixing chamber toward the center. The blades of one pair, however, twist or curve in an opposite direction about the rotor from the other pair, such that the blade portions of the respective pairs twist away from the direction of rotor rotation from opposite ends of the rotor toward the center of the mixing chamber. The blade portions of one pair are preferably displaced angularly from the blade portions of the other preferably about 90° so that their inner or adjacent ends are peripherally spaced. This, however, is not necessary as previously mentioned. Assuming that the rotor F rotates in the direction indicated by the arrow in FIG. 5, the pair of blades 150, 152 twist as shown in the drawings, that is, with the ends thereof nearest the feed screw threads 160, 162 leading the other ends.

Like the blade portions 130, 132 of rotor E the blade portions 154, 156 of rotor F extend along the body portion of the rotor to or approximately to the vertical centerline of the discharge screw G. Beginning at or approximately at the upstream end of the aperture 34 the blade portions 154, 156 merge or feather into the cylindrical body portion 140' of the rotor on a radius slightly larger than that of the chamber R in which the discharge screw G rotates. The radius is such that it is tangent with the exterior of the rotor body portion at or approximately at the plane of the vertical centerline of the discharge screw. From the plane of the vertical centerline of the discharge screw, the diameter of the cylindrical rotor body portion increases on the aforementioned radius to the end of the discharge chamber P where it terminates at the cylindrical section 110 of the rotor.

The angular displacement of the adjacent or inner ends of the respective pairs of blade portions of the preferred construction rotors shown provide gaps through which material being mixed can back flow for remixing. The gaps extend radially inward to a depth that approximately corresponds to the periphery of the rotor body portion which is generally cylindrical, preferably with a slight increase in diameter from the center of the bladed section to the infeed end thereof.

Figure 6:
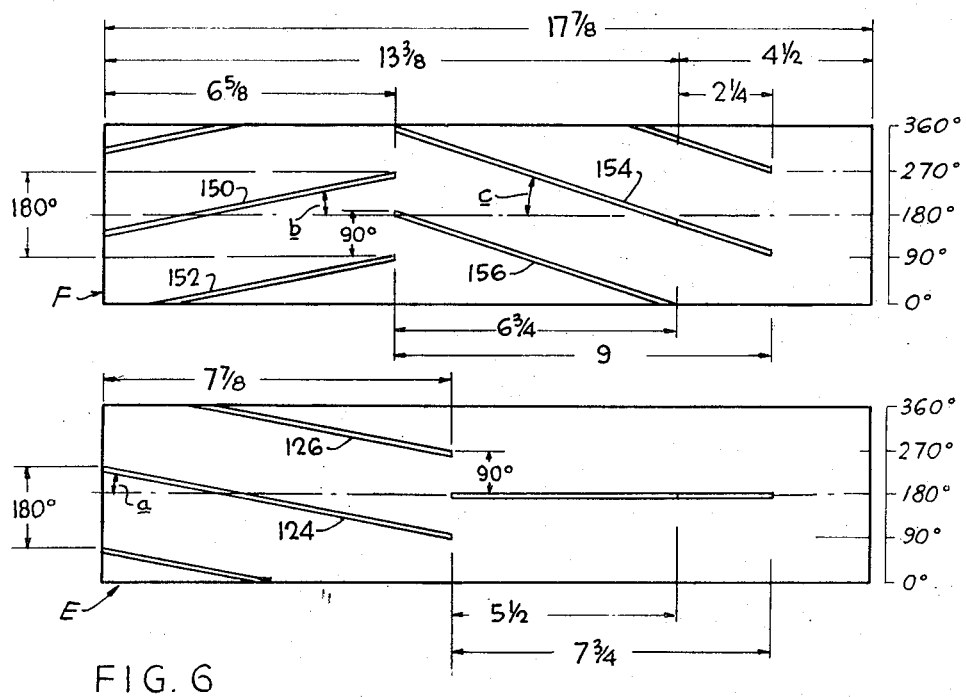
FIG. 6 is a diagrammatic development of portions of the rotors shown in FIGS. 3 and 4.
Figure 7:
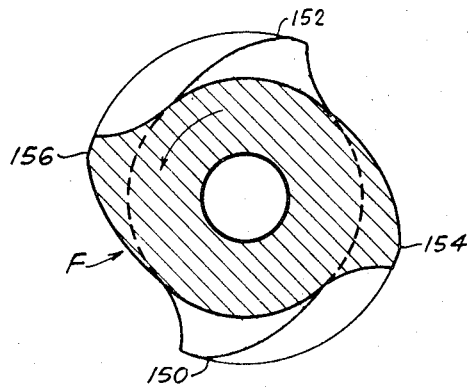
FIG. 7 is a sectional view approximately on the line 7—7 of FIG. 3.

The preferred arrangement and relative lengths of the blade portions of rotors the maximum diameters of the processing sections of which are about four inches (4'') are shown in the diagrammatic developed view, FIG. 6. The blade portions 124, 126 of the slow rotor E are the longest blade portions and the blade portions 130, 132 of full height the shortest. The blade portions 150, 152 of the fast rotor at the infeed end of the mixing chamber are slightly shorter than the blade portions 154, 156 of the full height which in turn are shorter than the blade portions 124, 126 of rotor E.

The discharge control screw sub-assembly 42 comprises the sub-frame 96 having the cylindrical chamber R within which the screw G driven by the drive K is located. The sub-frame 96 comprises a housing member 170 which forms the right-hand end of the sub-frame 96, a second housing member 172 detachably bolted to the left-hand side of the member 170 and a die assembly 174 at the discharge end of the housing member 172. The housing member 170 is detachably supported on the base D and both it and the housing member 172 are provided with apertures 180, 182, 184, closely encircling the chamber R in which the discharge screw G is supported for the circulation of the heat exchange medium in the structure forming the chamber R closely adjacent to the interior wall thereof to control the temperature of material being advanced through the chamber R by the screw G. The screw G has a spiral thread 186 thereon of any suitable construction which develops sufficient pressure to extrude the material being processed through the orifice 188 in the discharge die assembly 174.

The axis of the discharge screw G is in a vertical plane normal to the axes of the mixing rotors E, F and is offset below the mixing rotors such that the thread 186 of the discharge screw just clears the cylinder body portions 140, 140' of the rotors E, F. In the preferred embodiment of the invention shown the height of the mixing rotor blades or, in other words, the radial projection from the body portions 140, 140' of the rotors E, F, is approximately one-fifth the maximum diameter of the bladed portions of the rotors in the mixing chamber with the result that part of the thread 186 at the right-hand end of the control screw G, as viewed in FIG. 5, extends into the lower part of the portions of the cylindrical apertures 10, 12 which form the discharge member P of the apparatus with the result that material being processed is transferred directly from the discharge end of the cylindrical apertures 10, 12 or those parts thereof which make up the discharge chamber P directly to the cylindrical chamber R and the right-hand end of the control screw G.

The construction of the apparatus is such that the discharge control screw can be removed by removing the die assembly 174 and disconnecting the right-hand end of the screw from the speed reducer L, which drives the discharge screw. The screw can then be moved axially out of the chamber R toward the left, as viewed in FIG. 5. With the clamp screws 100 released and the discharge screw removed from the right-hand or infeed end of the chamber G the bearing assembly 54, the feed chamber sub-assembly 32, the discharge mixing chamber sub-assembly 62 and the discharge chamber assembly 36 can be moved as a unit axially of the rotors E, F, as illustrated in phantom lines in FIG. 1 clear of the rotors E, F, which remain connected to the seal and bearing assemblies 102, 104, respectively.

For the purpose of facilitating movement of the assemblies 32, 36, 54, 62 as a unit axially of the rotors E, F, the top side of the frame B, is provided with racks 190, 192 immediately to the outside of the guide surface 50, 52 upon which the feed chamber sub-assembly 32 is slidably supported. The racks 190, 192 are continuously in mesh with suitable pinions fixed to a shaft 194 rotatably supported in the sub-frame for the feed chamber sub-assembly and extending to the front of the machine, as viewed in FIG. 1, where it is provided with a hand crank 196 for rotating the same to move the aforementioned unit, including the assemblies 32, 36, 54, 62, axially of the mixing rotors E, F. The unit referred to can be moved towards the left, as viewed in FIG. 1, to expose as much of the mixing rotors E, F, as desired, and any substantial movement of the unit towards the left exposes the aperture 40 in the control screw sub-assembly and the right-hand end of the chamber R as the apparatus is viewed in FIG. 5. If desired, the aforementioned unit can be supported on an auxiliary base for rotation about a vertical axis which auxiliary base is in turn slidably supported on the guide ways 50, 52 thus permitting rotation of the unit after it has been moved sufficiently to the left to clear the left-hand end of the mixing rotors E, F.

In operation, material to be processed is introduced through the feed hopper 28 into the infeed section of the two counter rotating rotors E, F which are driven at a suitable speed by the variable speed motor H. The infeed screw conveys the material to the mixing chamber and the mixing section of the rotors within the mixing chamber. Alternatively, the infeed screws may be omitted and the material introduced directly into the upstream end of the mixing chamber as by moving the infeed opening 16 downstream and/or extending the upstream mixing blade portions 124, 126 and 150, 152 to the left, as viewed in the drawings. As the material moves into and through the mixing chamber, the blades of the mixing section of the rotor work the material within the mixing chamber in a generally back and forth manner by virtue of the oppositely twisting blade portions on each rotor. In addition, the blade portions of the rotors due to their high helix or lead angles spread the material within the mixing chamber against the inside surface thereof and shear the material between the blade portions and the mixing chamber wall. The material is also sheared between the rotor blade portions. The peripherally displaced inner ends of the blade portions of each rotor of the preferred embodiment, permits a limited flow of material through the gaps between the inner or adjacent ends of the blade portions so that the material will in part flow in a torturous mixing path as it is worked by the blade portions of the rotors.

Material within the mixing chamber progressively becomes a stiff homogenized gelatinous mass decreasing in viscosity towards the discharge end. Its movement out of the mixing chamber is in part effected by the mixing blades in the entrance part of the mixing chamber exerting pressure thereon through the more viscous material in the entrance end of the mixing chamber and by the pull or drag thereon effected by the discharge screw G. Lengthening the mixing blades at the entrance end of the mixing chamber relative to the blades at the discharge end enhances the flowthrough pressure exerted on the material being processed by the rotor mixing blades. In the chamber R the material being processed may be further worked by the control screw threads depending upon the construction of the screw.

The mixing process produces heat and the temperature in the various parts of the apparatus can be controlled by the circulation of heat transfer fluid through the various passages which are closely adjacent the inside walls or surfaces of the processing chambers, as already mentioned. The independent control of supply and exhaust of heat transfer fluid to the various chambers permits maximum temperaturecontrol and temperature control to establish the required temperature at different locations within the apparatus. The fact that the material mixed by the mixing rotors is directly transferred to the discharge screw without any intervening conduit between the mixing and the screw chambers provided optimum temperature control over the material being mixed and facilitates movement of the material through the apparatus.

As described above, an apparatus having parallel material processing rotors and a screw controlled discharge has been provided in which the material throughput is affected by operation of a screw in a discharge conduit which conduit is directly in communication with or connected to the material processing chambers. In the event that the outfeed or control screw is an extruder screw, it can be designed to further process or mix the material being processed in addition to the rotor mixing blades. The construction of the frame B and the sub-frames 48, 63, 90, 96, rotor bearing assemblies 54, 104 and some other parts of the apparatus have not been described in detail. Except for apparent differences they are similar to corresponding parts of the apparatus disclosed in the aforementioned U.S. Pat. No. 3,700,374.

From the foregoing description of the preferred embodiment it will be apparent that the objects heretofore enumerated and others have been accomplished and that there has been provided a novel and improved apparatus for continuously compounding rubber, elastomer, plastic and like material mixes.

Having thus described my invention, what I claim is:

1. In apparatus for compounding materials including solid ingredients which become gelatinous at above ambient temperature, such as rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated more lengthwise of the axis of the rotor than circumferentially thereof and the other pair of blade portions of the fast rotor being right helically orientated more lengthwise of the axis of the rotor than circumferentially thereof, and the pairs of blade portions nearest the conveying screw section of the slow rotor being right helically orientated more lengthwise of the axis of the rotor than circumferentially thereof and the other pair of blade portions of the slow rotor being straight and orientated parallel to the axis of the slow rotor.

2. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of each chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated more lengthwise of the axis of the rotor than circumferentially thereof and the other pair of blade portions of the fast rotor being right helically orientated more lengthwise of the axis of the rotor than circumferentially thereof and more inclined to the axis of the rotor than the other pair, and the pairs of blade portions nearest the conveying screw section of the slow rotor being right helically orientated more lengthwise of the axis of the rotor than circumferentially thereof and the other pair of blade portions of the slow rotor being straight and orientated parallel to the axis of the slow rotor.

3. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated more lengthwise of the axis of the rotor than circumferentially thereof and the other pair of blade portions of the fast rotor being right helically orientated more lengthwise of the axis of the rotor than circumferentially thereof and longer and more inclined to the axis of the rotor than the other pair, and the pairs of blade portions nearest the conveying screw section of the slow rotor being right helically orientated more of the slow rotor being right helically orientated more lengthwise of the axis of the rotor than circumferentially thereof and the other pair of blade portions of the slow rotor being straight and orientated parallel to the axis of the slow rotor.

4. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated more lengthwise of the axis of the rotor than circumferentially thereof and the other pair of blade portions of the fast rotor being right helically orientated more lengthwise of the axis of the rotor than circumferentially thereof and longer and more inclined to the axis of the rotor than the other pair, and the pairs of blade portions nearest the conveying screw section of the slow rotor being right helically orientated more lengthwise of the axis of the rotor than circumferentially thereof and being longer than either of the blade portions of the fast rotor and the other pair of blade portions of the slow rotor being straight and orientated parallel to the axis of the slow rotor.

5. In apparatus for compounding materials including solid ingredients which become gelatinous at above ambient temperature, such as, rubber, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated at angles of about 10° to 40° to the axis of the rotor and the other pair of blade portions of the fast rotor being right helically orientated at angles of about 20° to 50° to the axis of the rotor and longer than the other pair, and the pairs of blade portions nearest the conveying screw section of the slow rotor being right helically orientated at angles of about 10° to 40° and being longer than either of the blade portions of the fast rotor and the other pair of blade portions of the slow rotor being straight and orientated parallel to the axis of the slow rotor.

6. In apparatus for compounding materials including solid ingredients which become gelatinous at above ambient temperature, such as, rubbers, elastomers, plastics, and like mixes: structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; and means for rotating said rotors in opposite directions at different controlled speeds; said pair of blade portions of the fast rotor adjacent the conveying screw section thereof being left helically orientated at angles of about 10° to 40° to the axis of the rotor and the other pair of blade portions of the fast rotor being right helically orientated at angles of about 20° to 50° to the axis of the rotor and the pairs of blade portions nearest the conveying screw section of the slow rotor being right helically orientated at angles of about 10° to 40° to the axis of the rotor and the other pair of blade portions of the slow rotor being straight and orientated parallel to the axis of the slow rotor.

7. In apparatus for compounding materials including solid ingredients which become gelatinous at above ambient temperature, such as, rubbers, elastomers, plastics, and like mixes; structure forming a tubular material processing chamber comprising two side-by-side intercommunicating substantially cylindrical portions; two rotors one supported for rotation in each cylindrical portion of said chamber and each having a material conveying screw section followed by a material processing section comprising two pairs of blade portions offset with respect to one another lengthwise of the rotor of which they are a part; means for rotating said rotors in opposite directions at different controlled speeds; said pair of blade portions of the fast rotor adjacent the conveying screw section thereof being left helically orientated at angles of about 10° to 40° to the axis of the rotor and the other pair of blade portions of the fast rotor being right helically orientated at angles of about 20° to 50° to the axis of the rotor and longer than the other pair, and the pairs of blade portions nearest the conveying screw section of the slow rotor being right helically orientated at angles of about 10° to 40° to the axis of the rotor and being longer than either of the blade portions of the fast rotor and the other pair of blade portions of the slow rotor being straight and orientated parallel to the axis of the slow rotor; said structure also forming a material conveying conduit adjacent one end of said chamber intersecting the bottom portion of said chamber and extending transversely thereof; said chamber being provided with an opening adjacent the end thereof opposite said conduit for the entrance of material to be processed; a material conveying screw rotatably supported in said conduit with its axis offset below the axis of said rotor and with a portion of its thread extending into said chamber; and means to rotate said screw at a controlled speed; said structure forming said chamber and said conduit having passageways therein for the circulation of heat exchange medium closely adjacent the interior walls of said chamber and said conduit.

* * * * *